(12) United States Patent
O'Sullivan et al.

(10) Patent No.: US 7,502,839 B2
(45) Date of Patent: Mar. 10, 2009

(54) MODULE-BUILDING METHOD FOR DESIGNING INTERCONNECT FABRICS

(75) Inventors: Michael Justin O'Sullivan, Stanford, CA (US); Troy Alexander Shahoumian, Sunnyvale, CA (US); Julie Ann Ward, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1498 days.

(21) Appl. No.: 09/968,437

(22) Filed: Sep. 28, 2001

(65) Prior Publication Data

US 2003/0065758 A1    Apr. 3, 2003

(51) Int. Cl.
*G06F 15/177* (2006.01)
(52) U.S. Cl. .................................................... 709/220
(58) Field of Classification Search ................. 709/223, 709/238, 224, 220
See application file for complete search history.

(56) References Cited

U.S. PATENT DOCUMENTS

| | | | | |
|---|---|---|---|---|
| 5,426,674 A | * | 6/1995 | Nemirovsky et al. | 709/241 |
| 5,598,532 A | * | 1/1997 | Liron | 703/2 |
| 5,802,286 A | * | 9/1998 | Dere et al. | 709/220 |
| 6,697,334 B1 | * | 2/2004 | Klincewicz et al. | 370/238 |
| 7,000,011 B1 | * | 2/2006 | Ward | 709/220 |
| 7,032,013 B2 | * | 4/2006 | Ward et al. | 709/220 |
| 7,075,892 B2 | * | 7/2006 | Grover et al. | 370/238 |
| 7,076,537 B2 | * | 7/2006 | Ward et al. | 709/220 |
| 7,233,983 B2 | * | 6/2007 | Ward et al. | 709/220 |
| 7,308,494 B1 | * | 12/2007 | Drew et al. | 709/223 |
| 2002/0120770 A1 | * | 8/2002 | Parham et al. | 709/238 |
| 2002/0156828 A1 | * | 10/2002 | Ishizaki et al. | 709/201 |
| 2002/0188732 A1 | * | 12/2002 | Buckman et al. | 709/228 |

OTHER PUBLICATIONS

Ward et al., "Appia: automatic storage area network fabric design", Jan. 28-30, 2002, Conference on File and Storage Technologies (FAST '02), pp. 203-217.*

* cited by examiner

*Primary Examiner*—Douglas B Blair

(57) ABSTRACT

Disclosed is a method for designing a network with a given set of network flow requirements, each flow requirement having a source, a destination and a bandwidth. The method comprises the steps of assigning each flow to a port on its associated source and destination, determining the partition of source and destination ports into port groups which are disjoint sets, and generating network modules to support the assignment of flows by using an appropriate interconnected combination of links, hubs and switches. The design of the module accounts for the relative costs of the links, hubs and switches and finds the allocation and subsequent module design that produces a cost effective interconnection fabric that supports all flow requirements.

14 Claims, 10 Drawing Sheets

MODULE-BUILDING METHOD FOR DESIGNING INTERCONNECT FABRICS

FIELD OF THE INVENTION

The present invention relates to the field of computer network design. Specifically, the present invention relates to a method and system for designing cost-efficient computer networks of any size.

BACKGROUND OF THE INVENTION

Modern networking continues to provide electronic devices the ability to communicate with other devices. The continuing growth of networking systems and technology seems limitless and the speed of networked communications has brought benefits to nearly every human endeavor.

However, networks can consist of enormous numbers of devices. The complexity of networks continues to expand as does the application of network concepts to more and more disciplines and environments. More and more types of devices with differing specifications are added to the growing lists of elements within modern networks. A network may consist of a variety of types of devices, communicating over a variety of media and using various protocols. Such networks might include wireless devices, traditional voice, ATM, Frame Relay, Cable, DSL, and dial platforms. Optical networks are also becoming increasingly popular for performance reasons.

As networks get more complex, the design of network infrastructure, or interconnection fabric, becomes more important to the operating speed and efficiency of the all-up network. Consequently, increasing effort is put into improving configurations of complex networks from both a cost and speed viewpoint.

One area in which a cost-effective design is crucial is that of the rapidly emerging Fiber-Channel Storage Area Network (SAN) design. A SAN is a network of servers and storage devices that allows the sharing of huge stores of information among multiple user networks. SANs are extremely high-demand, high-speed, networks and their sizes have grown enormously. As a result, improving SAN design can significantly lower the cost of both construction and management of such networks.

Manual design of network infrastructure is a suitable technique in very small and simple networks. However, in large and complex networks, manual design techniques are iterative and tedious and rarely, if ever, produce an optimal result for any given network interconnection fabric requirement. Not only is the manual design process costly in terms of man-hours, deviations from an optimal design of the hubs, switches, routers, etc. needed in a network's infrastructure can result in money wasted on unnecessary interconnection equipment and higher maintenance costs. Moreover, manual methods can produce incorrect results in the sense that a manually designed network often fails to satisfy the performance requirements and/or physical constraints of the network components.

There are some automated design techniques in existence. However, these techniques either do not address physical constraints present in the SAN, do not produce cost-effective designs, or are very slow. Additionally, these techniques are often design-problem specific.

What is needed, then, is an automated method for designing networks that develops cost-effective design of interconnection fabrics by seeking low cost while simultaneously satisfying network performance requirements. Furthermore, the design method must be adaptable to the specific features of storage area network design problems and must be usable in available design systems.

SUMMARY OF THE INVENTION

The present invention provides a method for designing network interconnect fabric and interconnection modules that is highly automated and develops cost-effective design of interconnection fabrics while simultaneously satisfying network performance requirements. In addition, embodiments of the disclosed invention are adaptable to many levels of network design problems and can be adaptable to operate in any design environment.

Disclosed is a method for designing a network with a given set of network flow requirements, each flow requirement having a source, a destination and a bandwidth. The method comprises the steps of assigning each flow to a port on its associated source and destination, determining the partition of source and destination ports into port groups which are disjoint sets, and generating network modules to support the assignment of flows by using an appropriate combination of links, hubs and switches. The design of the module accounts for the relative costs of the links, hubs and switches and finds the allocation and subsequent module design that produces a cost effective interconnection fabric that supports all flow requirements.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation of this invention can be best visualized by reference to the drawings.

DETAILED DESCRIPTION

Figure 1:
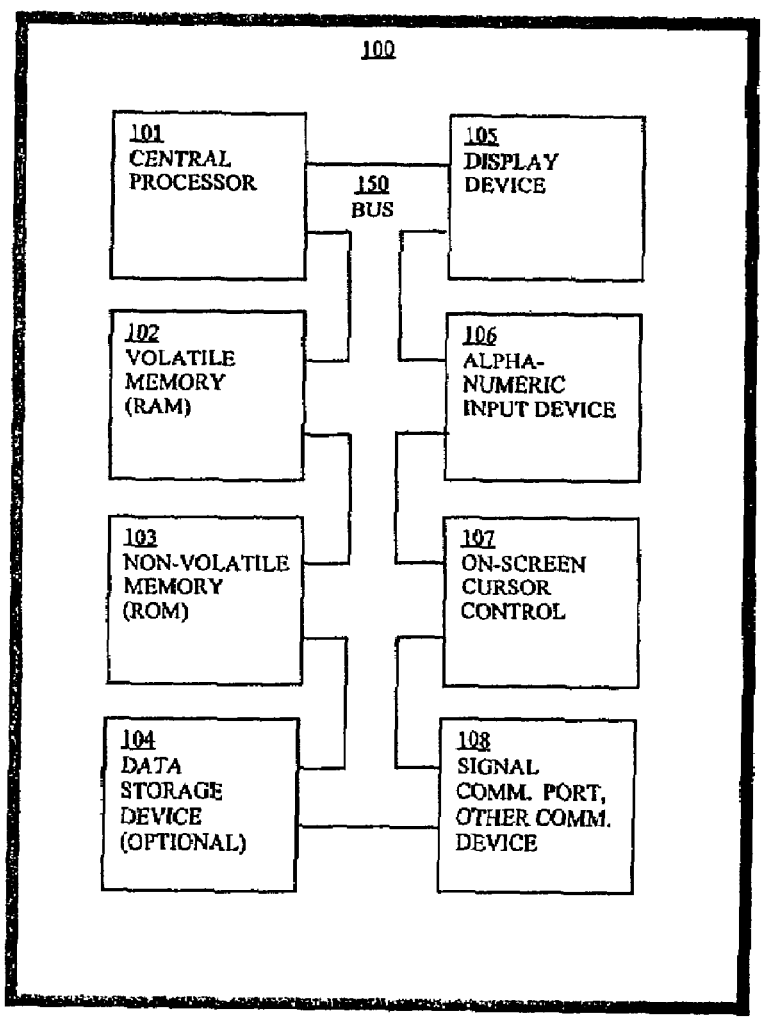
FIG. 1 illustrates a typical computer and bus architecture in accordance with one embodiment of the present invention.

This discussion of this embodiment of the present invention addresses the design of a Storage Area Network (SAN). The techniques employed in this embodiment, however, are applicable to any network that comprises source nodes and target nodes connected by a number of communication links. The method disclosed in this embodiment has been called various names, including "QuickBuilder", for the sake of simplicity of reference. Though the name applied has no bearing on the invention nor on its applicability, the term "QuickBuilder" will be used in this discussion to refer to this embodiment of the present invention.

This discussion of this embodiment of the present invention describes a method for automated design of an interconnection fabric between a given set of source nodes and a given set of terminal nodes. While the problem to which this solution applies is found in an enormous number of applications, the design of computer and computer-related networks is particularly applicable. Fiber Channel Storage Area Networks (SAN), as a most particularly applicable example, can be highly complex and expensive constructions. The many different design possibilities of such a network can have a wide variety of costs of construction and a poor design can slow performance characteristics and communication between devices or waste money in unnecessary over-provisioning and higher management costs.

This discussion of this embodiment of the present invention will focus on the design of SANs for the reason that these networks tend to be complex, costly and their performance in terms of speed is critical. As such, it is important for a SAN design to meet performance requirements in a cost-effective way.

The method described in this discussion of the embodiment of the present invention, because it can be executed in a computer, can solve much larger design problems than a human can solve by hand and produces error-free designs that are typically more cost-effective. As compared to existing network design methods, it can model the special features of the SAN design problem more accurately, including node costs and port constraints, and thus produce more effective designs.

In a SAN fabric design problem, a designer is given a set of sources, or host computers; a set of targets, or storage devices; and a set of required flows between them which are expressed in terms of request rates in bandwidth, generally measured in MBps. An interconnect fabric must be built to simultaneously support these flow requirements. The fabric, connecting hosts and devices, can be constructed from a set of available nodes which can be hubs, switches, routers and the like; adapters, such as Fiber Optic-to-PCI cards, and links, such as optical fiber cables or other communication media. The objective of the design problem is to design a fabric consisting of these components which meets the flow requirements at the minimum cost. This embodiment of the present invention achieves these sometimes opposing goals by pursuing a set of steps. The steps taken and the concepts presented in this embodiment can best be understood with reference to the attached figures.

This embodiment of the present invention is intended to be operated in an automated environment. It is especially adaptable to be used as a computer-aided design tool for networks. As such, it is expected that this embodiment will be used in a computer much like that present in FIG. 1.

FIG. 1 illustrates, in block diagram, a configuration typical to the type of computer on which this embodiment could be employed. Computer system 100 comprises bus 150 which connects processor 101, volatile RAM 102, non-volatile ROM 103 and data storage device 104. Also connected to the bus are display device 105, alpha-numeric input device 106, cursor control 107, and signal I/O device 108. Signal I/O device 108 could be implemented as a serial connection or some other communication protocol.

Figure 2:
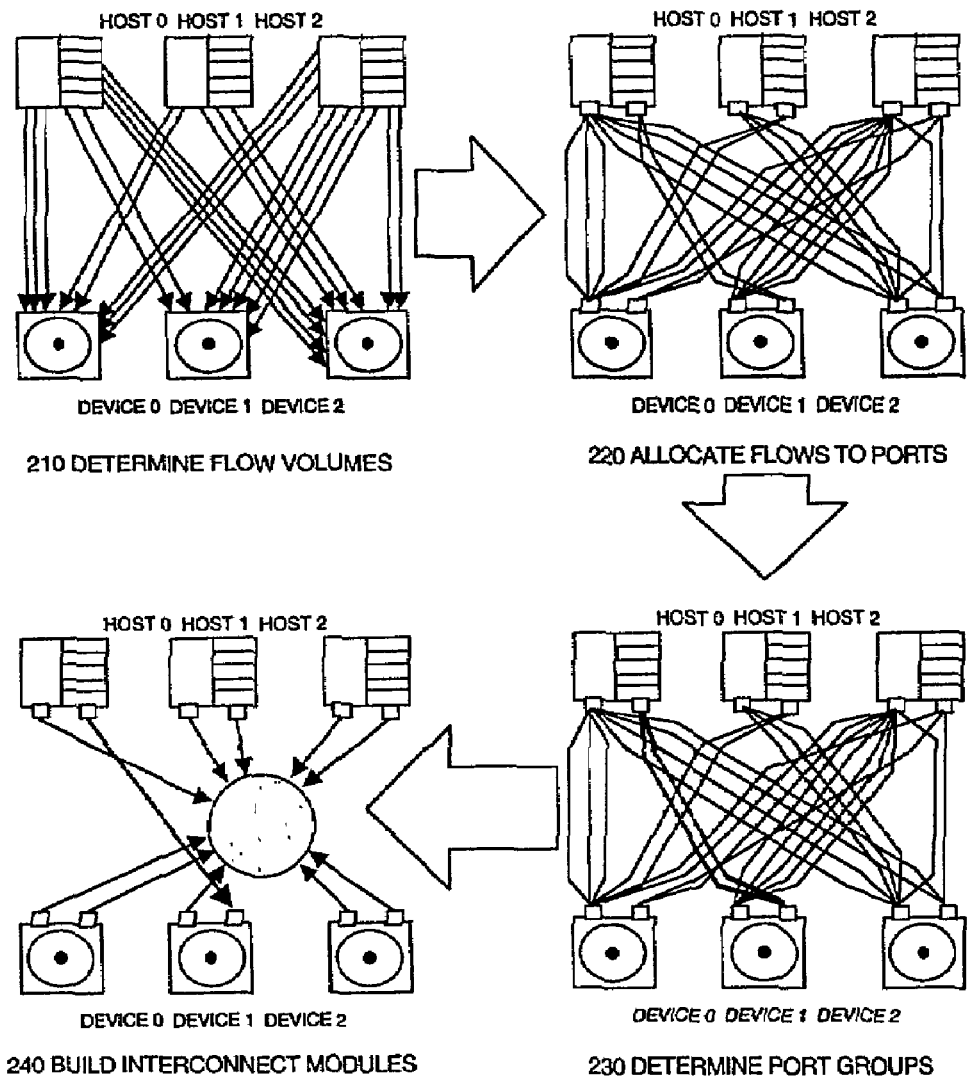
FIG. 2 illustrates a schematic diagram overview of an interconnect fabric design process in accordance with one embodiment of the present invention.

FIG. 2 is a simplified schematic diagram overview of an overall process implemented by this embodiment of the present invention. At the outset, network flow requirements are input, 210, to provide the basis for subsequent decisions. At 220, each flow is assigned to a port on its associated host and to a port on its associated device based on the flow requirements and port capability. The flow-to-port assignment process takes into account the advantages of coalescing certain flows together to form port groups that will ultimately allow for low-cost supporting modules. The port groups partition the host and device ports into disjoint sets and are determined at 230. Then modules, which are appropriate combinations of direct links, hubs and switches, are built to support each port group, 240. Typically, costs are lowest for direct links, higher for hubs, and higher yet for switches. The module design segment attempts to build modules by selecting the lowest-cost module for each port group. That means it will attempt to meet flow requirements with the least-cost module, hence the attempt to produce as many relatively inexpensive direct links as possible.

When building a module for a port group, if a direct-link or a multi-hub, which is a linked series of hubs, will not suffice, it is necessary to use a module containing switches. Building such a switch module involves recursively adding switches. When a switch is added, connections are added from some of the ports of the port group to the switch; the other connections are made later in the process. As a result, some of the flows might have their associated source port connected to the switch, but not the associated destination port, or vice versa. At this point in the process, the flow has a way into the switch but no path out. A flow in this situation is a "hanging flow". Note that switch module construction is generally the most costly of the means of interconnection.

Figure 3:
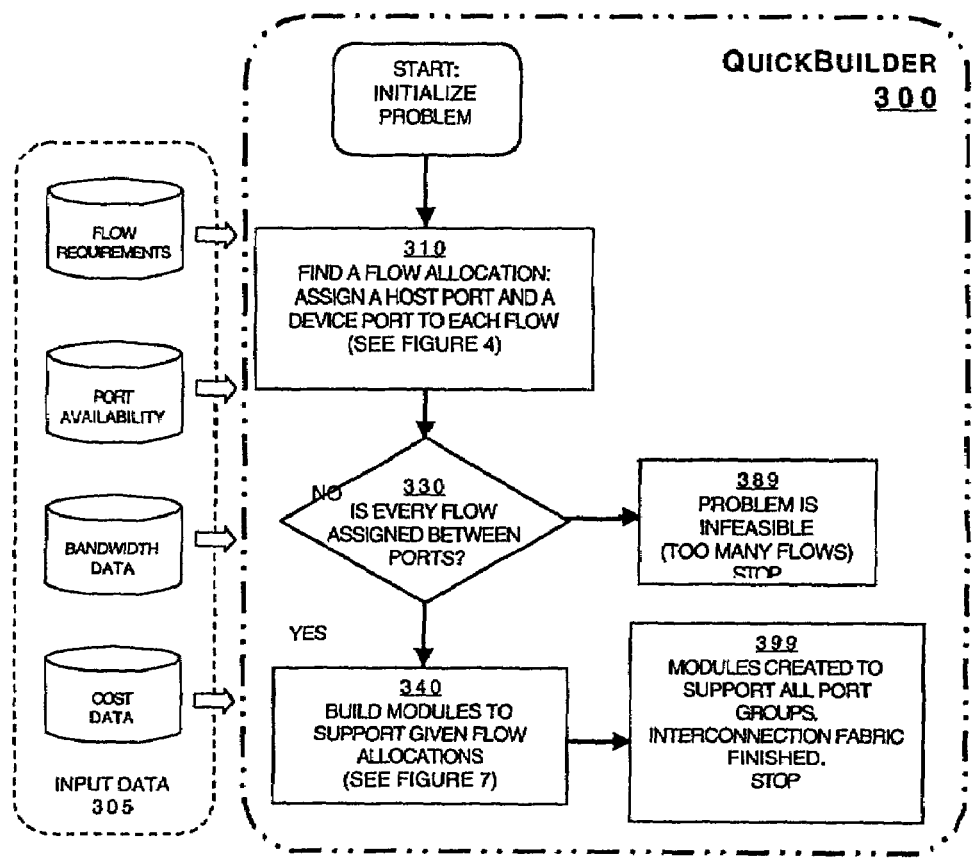
FIG. 3 illustrates a block diagram overview of an interconnect fabric design process in accordance with one embodiment of the present invention.

FIG. 3 illustrates, in flowchart form, the overall process of network interconnect fabric design described in this embodiment of the present invention, called here QuickBuilder. QuickBuilder process 300 comprises flow-to-port assignment 310 and module building 340. Using input data 305, flow-to-port assignment 310 determines on which port each flow exits its associated host and on which port each flow enters its associated device. For any given flow, a port assignment defines a unique host port and a unique device port for the flow (See expansion in FIG. 4). Making a port assignment sends the given flow from that host port to that device port. Hosts and devices in general have multiple network ports and so the QuickBuilder process must decide the port of each flow's exit and entry. The term "flow-to-port assignment" is used in this discussion to include the process of defining a port assignment for every flow in the network.

When a flow-to-port assignment is completed, an evaluation is made, 330, to determine if every flow is assigned to a port group. If not, there are too many flow requirements for the available ports and the problem is not feasible, 389. If all flow requirements are met with port assignments, then an interconnect fabric is built, 340, to accommodate the flow-to-port assignments and the process is complete, 399. Note that 340 is expanded in FIG. 7.

As shown at 210 in FIG. 2, there can be different flow requirements that are associated with the same host and same device. In making the flow-to-port assignment, as shown in the block diagram of the expansion of step 310 illustrated in FIG. 4, flows assigned to the same ports are designated to be in the same "port group". The port groups are disjoint subsets that partition the host and device ports. Two ports with a flow assigned between them fall into the same port group. In this embodiment of the present invention, all flows in the same port group are required to be routed through the same interconnect module.

Figure 4:
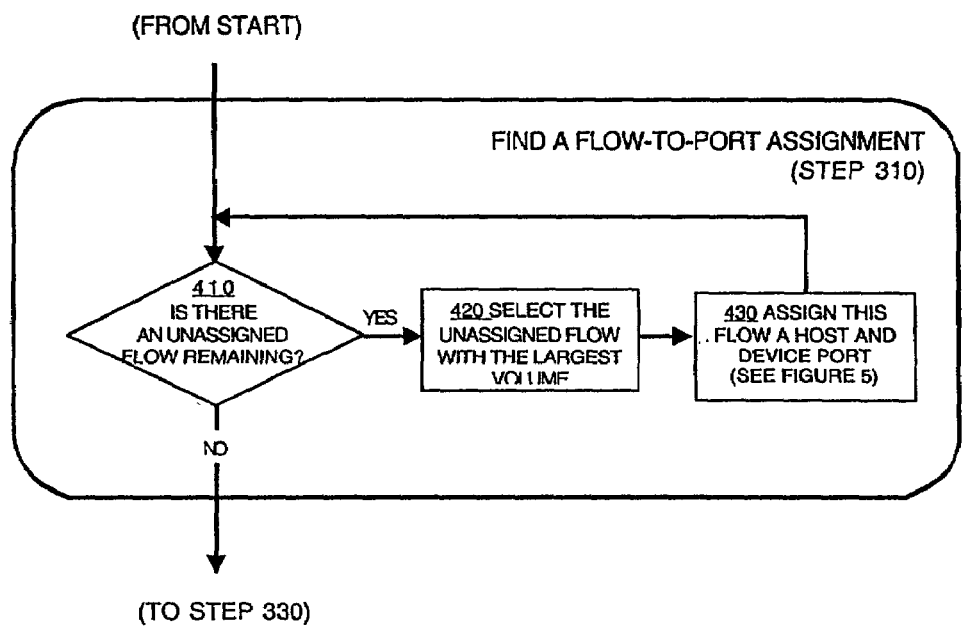
FIG. 4, an expanded version of step 310 in FIG. 3, illustrates a block diagram view of a flow-to-port assignment process in accordance with one embodiment of the present invention.

As shown if FIG. 4, step 310 is recursive in that it checks for unassigned flows at 410, selects an unassigned flow at 420 and assigns a host and device port to the flow, 430, then checks again at 410 for unassigned flows. As the Quick-Builder process continues, each iteration of a module design will be assessed for its ability to support each port group assigned to it, shown in FIG. 7. A module can only be determined to support a port group if every flow in the port group is fully enabled, host port to device port through the module.

Figure 5:
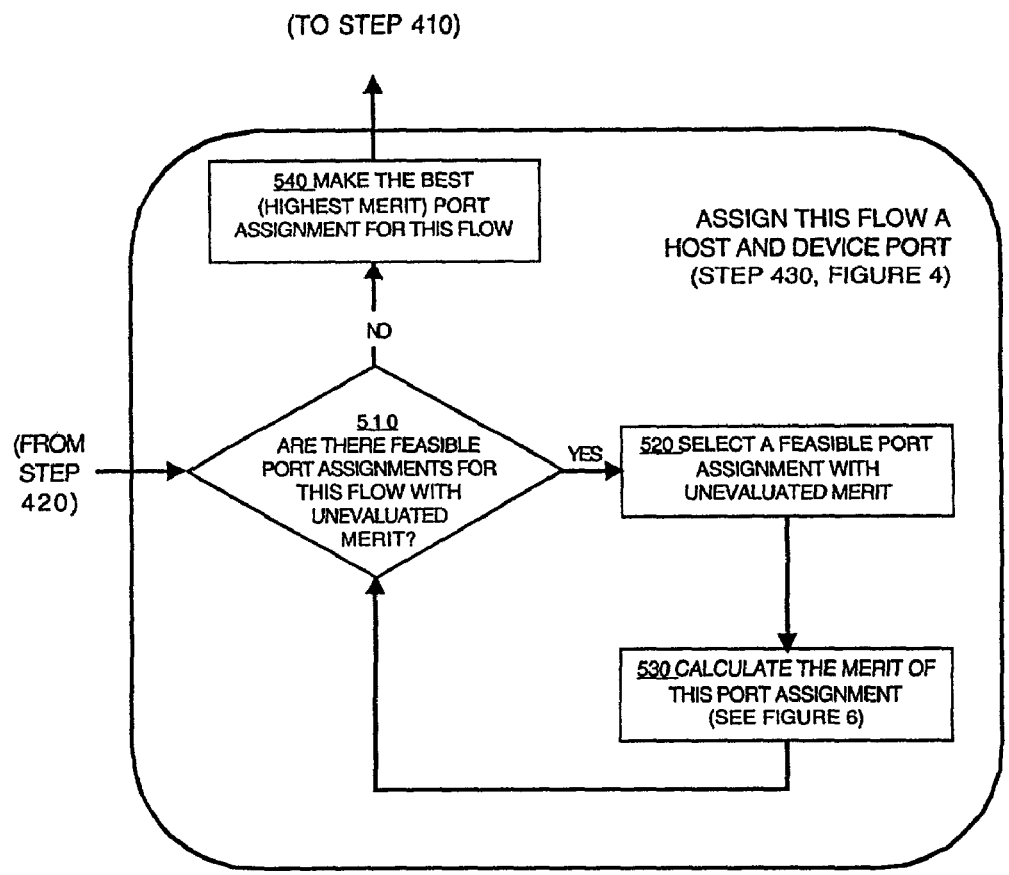
FIG. 5, an expanded version of step 430 in FIG. 4, illustrates a block diagram view of a flow-to-port assignment process in accordance with one embodiment of the present invention.
Figure 6:
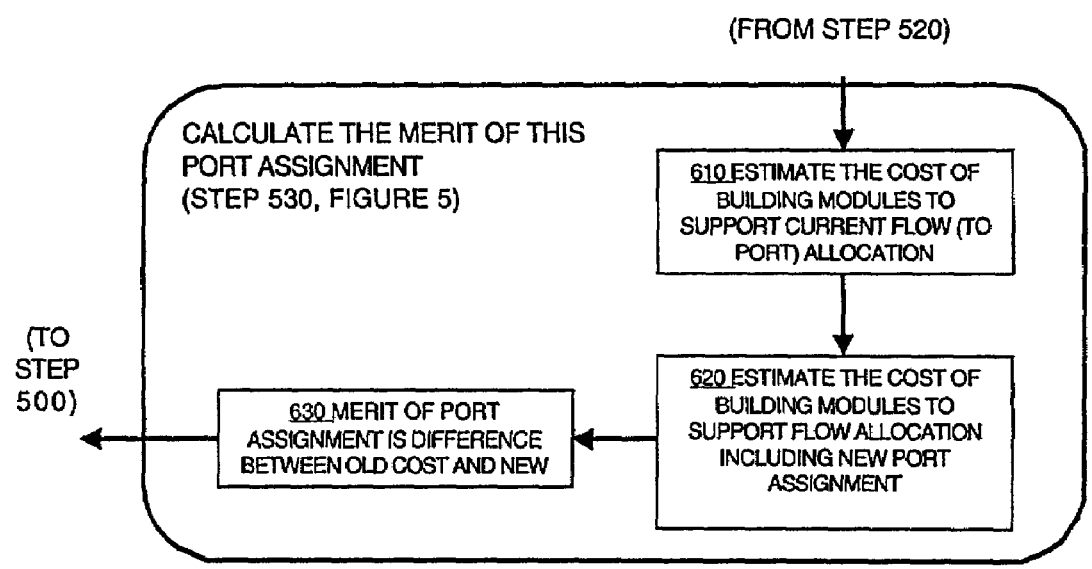
FIG. 6, an expanded version of step 530 in FIG. 5, illustrates a block diagram view of a flow-to-port assignment merit calculation process in accordance with one embodiment of the present invention.

Step 430 in FIG. 4 is expanded in FIG. 5. Each flow is checked at 510 to determine if there are feasible port assignments with unevaluated merit. If there are, a feasible port assignment is selected at 520 and the merit of the assignment is calculated, 530, as shown in FIG. 6. Once all feasible port assignments have been evaluated, the highest merit assignment is made at 540.

FIG. 6 is the expansion illustration of step 530. Merit of port assignments is calculated by estimating the cost of building modules to support the existing flow-to-port allocation, 610. Then the cost of building modules is estimated with the inclusion of the new port assignment, 620. The merit of the port assignment is the difference between the "old cost" and the "new cost," 630.

Figure 7:
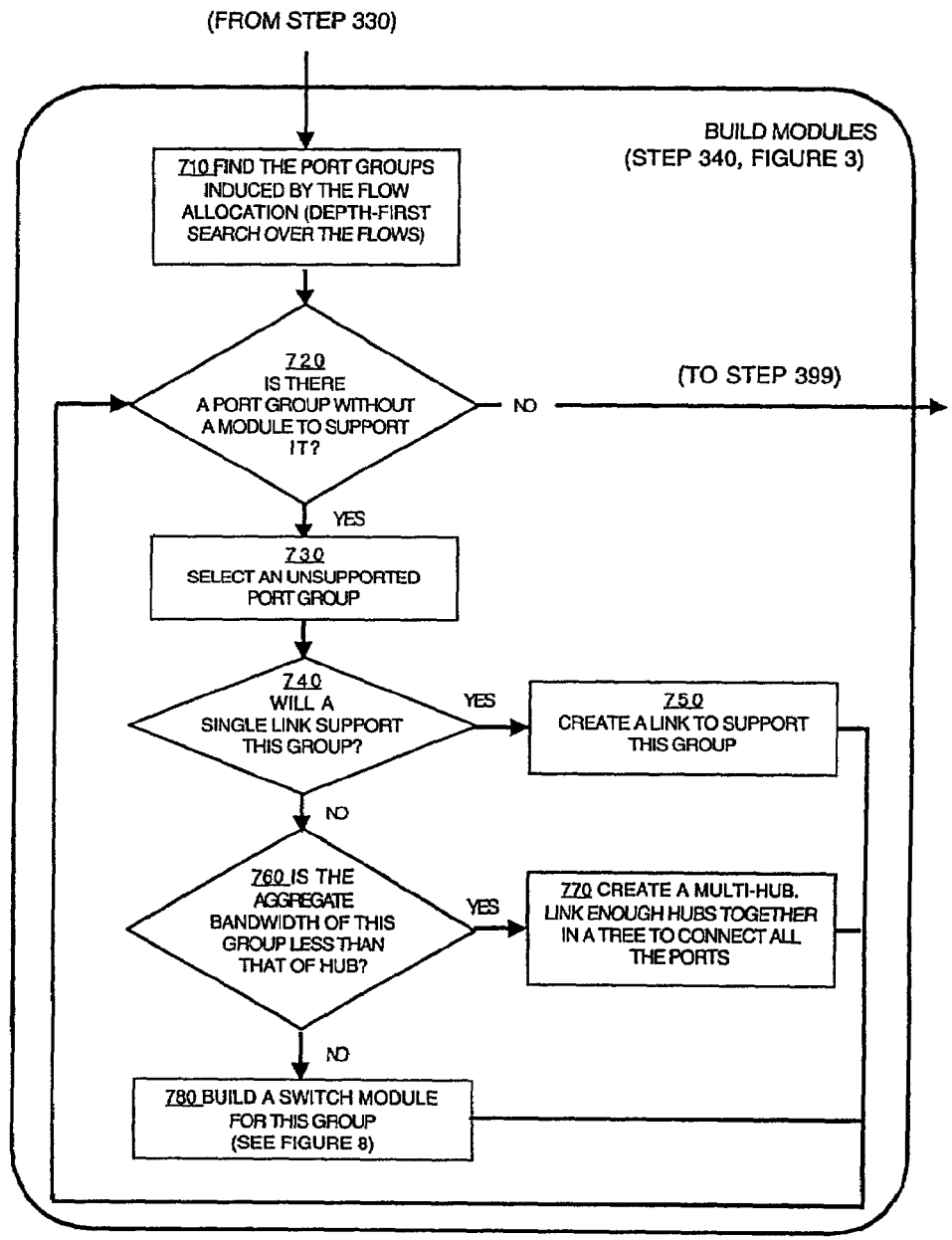
FIG. 7, an expanded version of step 340 in FIG. 3, illustrates a block diagram view of an interconnection module building process in accordance with one embodiment of the present invention.

Once every flow is assigned between ports, as determined at 330 in FIG. 3, modules are built to support the assignments, 340. FIG. 7 is an expansion of 340.

In FIG. 7, the port groups are found, 710, that are induced by the flow allocation. Each port group without a supporting module, 720, is selected, 730, and evaluated for the level of module support it requires in a cheapest-first fashion. If a direct link will support the port group, 740, a link is created at 750. If not, the group is checked at 760 to determine if its aggregate bandwidth is less than that which would require a hub for support. If so, a multi-hub is created at 770 to meet the port requirements. If the aggregate bandwidth exceeds a hub capability, then a multi-switch must be built, 780.

Figure 8:
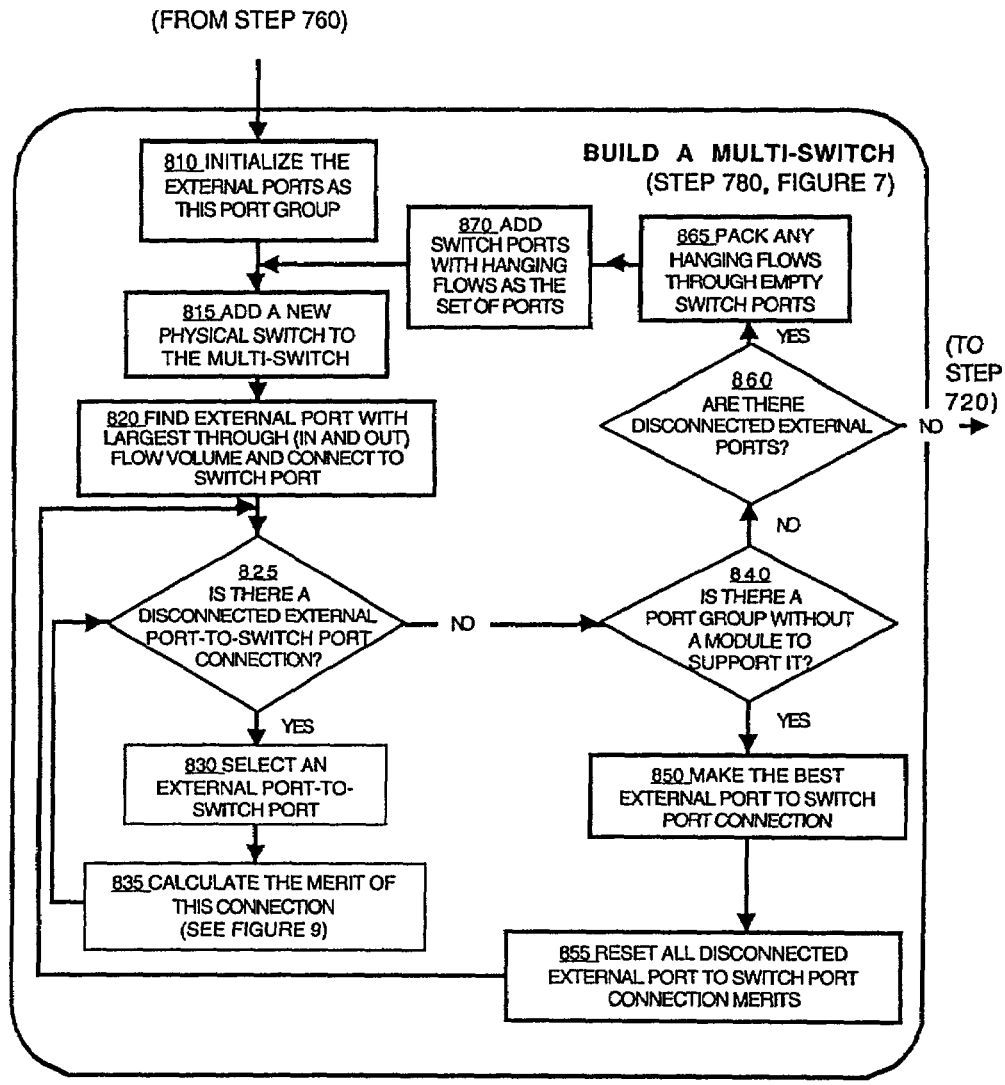
FIG. 8, an expanded version of step 780 in FIG. 7, illustrates a block diagram view of a switch module building process in accordance with one embodiment of the present invention.

FIG. 8 is the expansion illustration for step 780. At 810, the external ports are initialized as the port group. A new switch is added to the multi-switch, 815, and the external port with the largest through flow volume is connected to it at 820. If there is a disconnected external port-to-switch port connection, 825, an external port to switch port is selected, 830, and the connection merit is calculated at 835 (see expanded illustration in FIG. 9). Once there is no disconnected connection, the port groups are evaluated to determine if there is a port group without a supporting module, 840. If there is, the best external port to switch port connection is made, 850, and all the external port to switch port connection merits are reset and recalculated at steps 825 through 835. If every port group has a supporting module but there are disconnected external ports, 860, any existing hanging flows are packed through empty switch ports, 865, and switch ports with hanging flows are added as the set of port with which to reiterate steps 815 and subsequent. Once there are no disconnected external ports, 860, the process returns to step 720.

Figure 9:
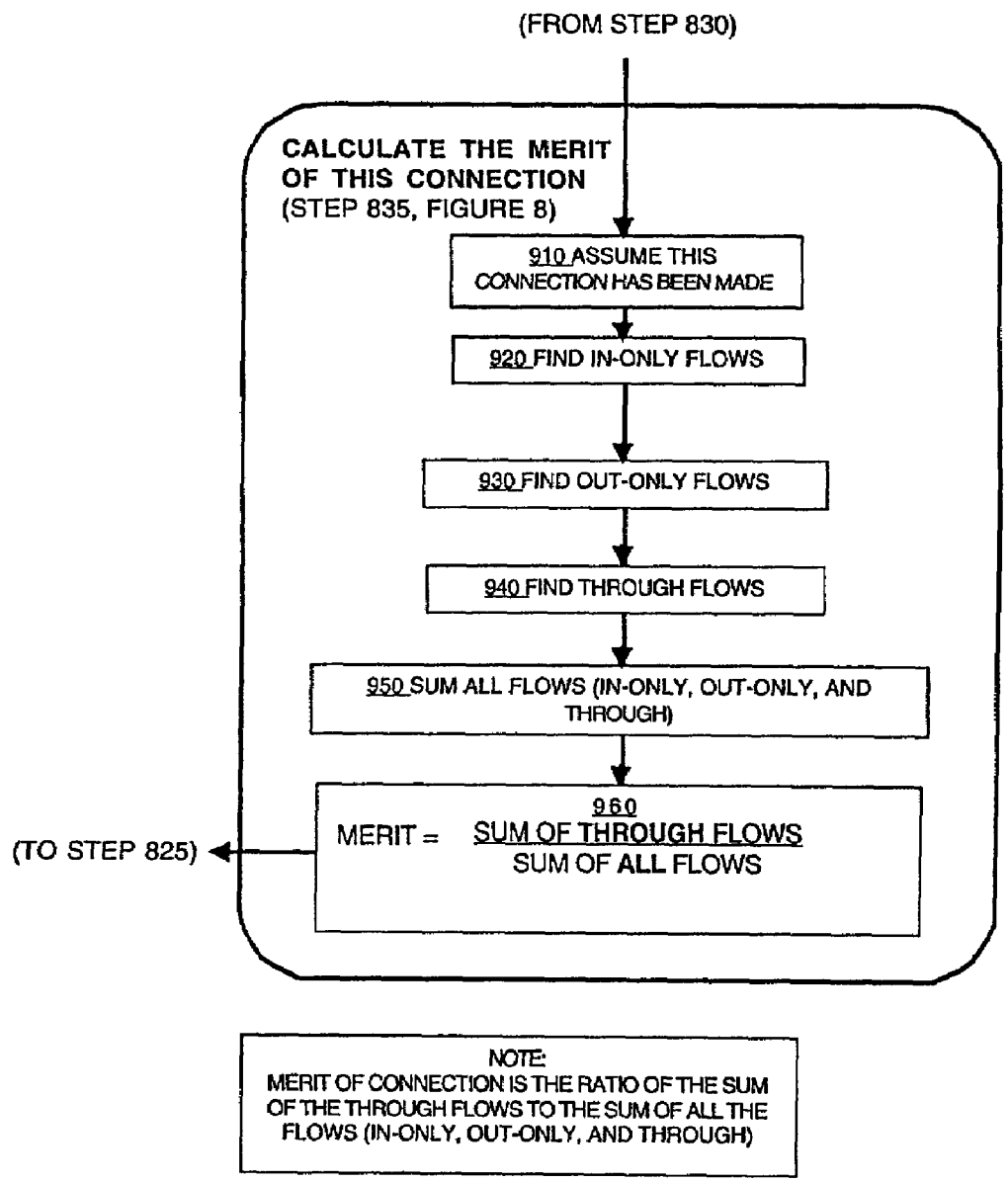
FIG. 9, an expanded version of step 835 in FIG. 8, illustrates a block diagram view of a connection merit calculation process in accordance with one embodiment of the present invention.

Module design is a recursive process with specific assessment routines designed to determine the efficacy and efficiency of each design. These routines require the comparison of fully enabled flows to non-enabled flows, as illustrated in FIG. 9, the expanded illustration of connection merit calculation, step 835. In modules which employ switches, non-enabled flows, or hanging flows, are either "in-only" flows or "out-only" flows. An in-only flow has an external port to switch port connection carrying the flow into the switch, but no such connection carrying it out. That is, a destination port is not yet connected to the switch. An out-only flow has an external port to switch port connection carrying the flow out of the switch, but no such connection carrying it in. That means a source port has not yet been connected to the switch. An enabled flow, one that has an external port to switch connection carrying the flow into the switch, and a switch port to external port connection carrying it out, is a "Through flow".

In FIG. 9, the connection merit is calculated by first assuming a given connection has been made, 910. In-only flows (920), out-only flows (930) and through flows (940) are summed at 950. The merit of the connection is the sum of all through flows divided by the sum of all flows, 960.

It is noted here that, in this embodiment, an external port is one of the set of ports that needs to be connected to a switch module. These ports may either have belonged to the original port group that is supported by the switch module or may have been added while building the switch module to provide a means to move flow between switches.

The port groups can be characterized as follows. Given a flow-to-port assignment, the port group of a port p can be defined. The port group of port p is a set of ports that includes p; if q is a port in the port group and a flow assigned to q is from or to port r, then r is also in the port group. In short, the port group of port p includes p and all ports with which p must communicate and all ports with which those ports communicate and so on. A module is built to support the communication within each port group. A module is said to support the corresponding port group.

For each flow-to-ports assignment contemplated, the feasibility of the assignment must be assured. It is obvious that, if a port cannot support the flows assigned to it, the assignment is not feasible. For example, if a 75 Mb flow is assigned to a 100 Mb port, the port cannot support and additional assignment of a 50 Mb flow to the same port. However, further checking is required. If the flow is assigned to port p, on Host H, for example. it must be assured that the other flows from H can get through port p and the remaining ports. The prototype example is that, if H has two 100 Mb ports and flows of 20, 30, 70 and 80, then the first two flows cannot be assigned to the same port; this notwithstanding the fact that their combined volume of 50 Mb fits on the 100 Mb flow.

If the assignment of the flow to a pair of ports is feasible, the savings realized by such an assignment must be estimated. Consider the routing of a flow from port p to port q. If p and q were previously in different port groups, this new routing would merge the two port groups and the savings would be the difference between the estimated cost of a module to support the new port group containing p and q and the sum of estimated module costs to support the original separate port groups containing p and q. If p and q are already in the same port group, the savings is the difference between the estimated cost of a module to support the group containing p and q with the new flow included and the estimated cost of a module to support the group containing p and q without the new flow included.

In estimating the cost of a module to support a port group at this step in this embodiment of the present invention, the following procedure is undertaken. If a port group consists of only two ports, a direct link will be used. The estimate is the cost of a direct link plus the cost of the two ports, one each on the host and device.

Figure 10:
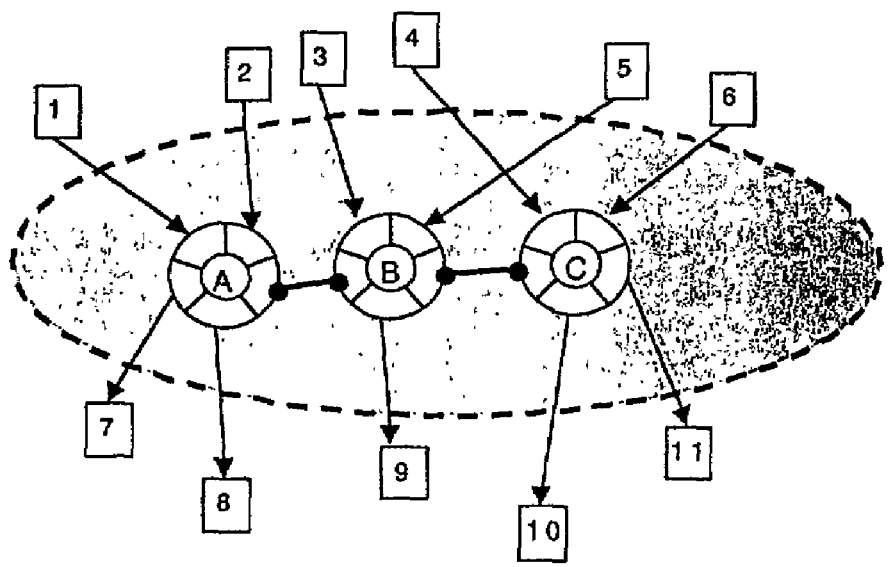
FIG. 10 illustrates a schematic representation of a serially-linked multi-hub module in accordance with one embodiment of the present invention.

If the total flows to be routed can be routed through a hub, as determined from a bandwidth standpoint, then a hub or multi-hub can be used. If the number of ports in the port group is at most n, the number of ports on a hub, then 1 hub suffices. If there are k>n ports in a port group, then a number of hubs h will be needed where h=ceil((k−2)/(n−2)) hubs. Note here that the "ceil" function returns the nearest integer that is not smaller than the argument (in outermost parentheses). Hubs are connected serially until enough free ports are available on the multi-hub. As an example, assume that 11 free ports on the multi-hub are needed and five-port hubs are the available building unit. Then, in this example of this embodiment, three hubs, A, B and C, may be connected as in FIG. 10: one link from hub A to hub B and another link from hub B to hub C. In this example, four ports remain open on each of the two end hubs (A and C) and three free ports on the middle hub. The estimate on the module group is the h*(hub cost)+(h−1)*(2*(hub port cost)+(link cost))+k*((hub port cost)+(link cost))+(the cost of the ports on the hosts and storage devices). These four terms correspond to: (a) the cost of the hubs; (b) the cost of the links between hubs and the cost of the hub ports thus used; (c) the cost of the links between the multi-hub and the ports in the port group; and (d) the cost of the ports on the hosts and storage devices.

If the total flows to be routed cannot be routed through a hub, a switch module is needed. Let k be the number of ports in the port group, and let n be the number of ports on a switch. This embodiment of the present invention estimates the cost of a switch module as follows. The flow volumes are first increased by 10% to account for bandwidth wasted in the movement of flows between switches. Then the minimum number of switch ports k is found that is required to support the adjusted flows, using a bin-packing process. The cost estimate of the module group is (switch cost)*ceil(k/n)+(cost of links and/or hubs needed to connect ports to the switch ports)+(the cost of the ports). In general, flows from different ports in the port group can be routed onto the same switch port. To facilitate this, a hub or multi-hub is used to coalesce flows from different ports onto the same switch port. The method previously described is used to estimate the cost of the hub or multi-hub. This process continues until each flow has a host port on which to exit and a device port on which to enter.

The second step of the QuickBuilder process is to build the modules; the groups of interconnected hubs, switches, and links to support the routing of flows given the flow-to-port assignments. After assigning each flow to a port on its host and device, there is a set of port groups. For each such port group, a supporting module is created to route flows between the ports in that group. In this embodiment, flows are considered one at a time in the order of decreasing bandwidth. An alternative ordering could also be effected. Each combination of host and device port is recursively considered.

The first two scenarios for building modules mirrors the way module costs were estimated. If a port group has only two ports, then a single direct link is employed between them to route the flows. Otherwise, if the total flow volume routed between ports in the port group is less than the bandwidth of a hub, then a multi-hub is built and used to route that flow. In building a multi-hub, enough hubs are connected serially so that enough free hub-ports are available to connect to all ports in the port group. If there is too much flow volume to fit through a hub or multi-hub, then a switch module is constructed as a supporting module for the port group.

The construction of a switch module in this embodiment of the present invention is now described. The input to the switch module construction process is a set of ports, each with a set of in-flows and out-flows. This generality of inputs is needed because this will be a recursive procedure. In the initial call, the ports will be host ports with only out-flows and device ports with only in-flows. On subsequent calls to the procedure, some of the ports will be switch ports on switches that have already been added to the switch module. Such switches may have both in- and out-flows.

The first step is to add a switch to the switch module. Note that this implementation of this embodiment of the present invention uses a given kind of switch, hub, and link to use when building modules. Then the first port to link to the multi-switch is selected. In this embodiment of the present invention, the port with the most flow bandwidth going through it is the first selected and connected to the switch.

The decision process for choosing the second and subsequent ports to connect up to the switch is different and described next. For each of the external ports not yet connected to the switch in the switch module, a feasibility check is done to see if it can be connected to the switch. If more than one such connection is feasible, a merit score of connecting each external port to the switch is computed, and the connection is made based on the highest merit score.

The feasibility test has two parts. First, a check is done to determine if there is a port on the switch with sufficient unallocated capacity to accommodate flow bandwidth to and from the port. Switch ports that already have an external port connected to them are not excluded. That is, more than one external port is specifically allowed to connect to the same switch port; this physical impossibility is removed later with the insertion of a hub or multi-hub. Therefore, the port's remaining capacity to handle the in- and out-flows of the external port is looked at. Given a port with remaining capacity to handle the new flow's entrance to or exit from the switch, the feasibility of connecting the external port to the switch port is examined. Specifically, if this new connection is made, there will possibly be flows entering the switch and not leaving it, or leaving the switch but not yet entering it. For these flows, it is attempted to bin-pack them into the completely free ports, the ports not yet connected to any external ports, that remain on the switch. If the flows can be packed into these ports, then the connection passes the feasibility test. Note: Nothing is connected to the switch during the bin-packing. All that is occurring is a simple check on the connection being considered.

For each external port considered for connection to the switch next, it is checked for feasibility. For each switch port to which it can be feasibly connected, a merit score is calculated. There are three values of interest.

T is the through-flow volume. For all external ports connected to the switch, some of the flows have both their source and destination ports connected to the switch. These calculations are done assuming the new connection from the external port to the switch port has been made. The volumes of these flows are added to get the T value. I is the in-flow volume. For the same set of external ports, the flows that have their source port connected to the switch, but not the destination port, are looked at. The sum of these flows' volumes gives I. O is the out-flow volume. Adding up the volume of all flows that only have their destination port connected to the switch gives O.

The merit score is given by T/(T+I+O). The feasible external port with the highest merit score is connected to the switch port identified by the first step of the feasibility test. When there are no more ports to connect to the current switch, any infeasible situations created by connecting more than one external port to the same switch port are resolved. A hub or multi-hub is used to allow more than one external port to connect to a single switch port.

Any hanging flows, flows entering the switch but not leaving it or leaving the switch but not entering it, are resolved by packing them onto free ports on the switch. This is done using a bin-packing routine. This results is switch ports with flows that move in/out of the switch and out/in to the rest of the modules. These switch ports now become external ports for the remainder of the modules; that is, they are added to the set of external ports.

If not all of the external ports were connected to the switch just added (remember that hanging flows may have introduced some more external ports), then a multi-switch on the remaining external ports, the rest of the module, is recursively built. For the new problem, the ports consist of the external ports that were not connected as well as the free ports on the switch used to pack the hanging flows. The flows for the external ports are the same as in the original problem. For the switch ports, flows were packed onto them once no more connections could be made to the switch. These will be in- and out-flows for the port in the new problem. As an example, suppose that in the last feasibility check, one 50 Mb flow entered the switch but did not exit, that is, the switch was not connected to the destination port. Additionally, one 75 Mb flow exited the switch but did not enter. Suppose there is one completely free 200 Mb port. Both flows fit onto the free port, and this free port enters the new problem as a new external port with one 50 Mb out-flow and one 75 Mb in-flow. If only one external port may be connected to switch, infinite recursion is avoided by spreading the port's in- and out-flows over two empty switch ports. Note that it is assumed that a switch has more than two ports.

When the process returns from the recursive call, the module will support all of the ports given to it. The ports given to the recursive call include external ports in the problem that were not connected to the switch just added; it also includes ports that are free on this switch and were used to pack hanging flows. For connections between external ports—in the problem—and the module, these become real connections to the module being built. Connections between free switch ports in the present problem and the module become internal links in the module under construction.

After the module is created, flows must be routed in the module. If both the source and destination ports to the switch are connected, then the path consists of two-steps, with the switch in the middle. As a second case, suppose a flow is routed from an external port to the switch but the destination port to the switch failed to be connected. In this case this initial path—from source to switch—is taken and the path given in the recursive call is appended. The third case is where only the destination port to the switch is connected. The recursive call gives the path from the source port to the switch that was added; the final link from this switch to the destination port is simply appended.

There are other possible implementations of the Quick-Builder framework in this embodiment. All use the two-step procedure described previously; i.e., 1) Find a Flow-to-port assignment; 2) Build Modules. However, during flow-to-port assignment, these implementations use different criteria for deciding which flow to assign, or even move a flow to a different assignment. This also means the termination criteria can be different.

The method(s) used to estimate the cost of the modules may also be different, perhaps by using previous knowledge about the relationship between the number of ports, aggregate bandwidth and the final cost of the module. Further, when building modules, different packing methods, as opposed to first fit bin-packing, may be used for checking external port to switch port feasibility and packing hanging flows onto free switch ports. Finally, other implementations may use different merit functions for comparing port assignments and comparing external port to switch port connections.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for designing a flow network, said method comprising:

determining a set of flows, wherein each flow is a communication between a host and a device;

assigning a host port and a device port for said each flow, wherein said assignment is based on a current flow cost and a new port assignment cost;

determining one or more port groups, wherein a port group comprises one or more flows and ports associated with said one or more flows; and designing a network module for each of said one or more port groups, wherein building comprises determining if said network module comprises a switch, wherein said switch determination is based on in-only flows, out-only flows, and through flows, 2. The method described in claim 1, wherein said assigning ports is based on flow bandwidth.

3. The method described in claim 1, wherein said assigning ports is based on a ranking of said each flow.

4. The method described in claim 3, wherein said ranking is based on descending order of bandwidth.

5. The method described in claim 1, wherein said switch determination is based on a sum of through flows divided by the stun of in-only flows, out-only flows, and through flows.

6. The method described in claim 1, wherein said designing of said network i-nodule is performed automatically.

7. The method described in claim 1, wherein said designing of said network module seeks a least cost solution.

8. The method described in claim 1, wherein said designing of said network module seeks a cost-effective network.

9. A method for designing a flow network, said method comprising:

determining a set of flows, wherein each flow is a communication between a host and a device;

assigning a host port and a device port for said each flow, wherein said assignment is based on a current flow cost and a new port assignment cost;

determining one or more port groups, wherein a port group comprises one or more flows and ports associated with said one or more flows; and designing a network module for each of said one or more port groups.

10. The method described in claim 9, wherein said device is a storage device.

11. The method described in claim 9, wherein said assignment is based on bandwidth.

12. The method described in claim 9, wherein said network module comprises direct links, network hubs and network switches.

13. The method described in claim 9, wherein said method-for designing said flow network is an automated process.

14. The method described in claim 9, wherein said method-for designing said flow network is a cost-efficient design.

* * * * *

UNITED STATES PATENT AND TRADEMARK OFFICE
CERTIFICATE OF CORRECTION

| | | |
|---|---|---|
| PATENT NO. | : 7,502,839 B2 | Page 1 of 1 |
| APPLICATION NO. | : 09/968437 | |
| DATED | : March 10, 2009 | |
| INVENTOR(S) | : Michael Justin O'Sullivan et al. | |

It is certified that error appears in the above-identified patent and that said Letters Patent is hereby corrected as shown below:

In column 10, line 42, in Claim 1, delete "flows," and insert -- flows. --, therefor.

In column 10, line 51, in Claim 5, delete "stun" and insert -- sum --, therefor.

In column 10, line 53, in Claim 6, delete "i-nodule" and insert -- module --, therefor.

In column 12, line 1, in Claim 13, delete "method-" and insert -- method --, therefor.

In column 12, line 5, in Claim 14, delete "method-" and insert -- method --, therefor.

Signed and Sealed this

Sixth Day of April, 2010

David J. Kappos
*Director of the United States Patent and Trademark Office*